United States Patent
Shinke et al.

(10) Patent No.: US 11,498,993 B2
(45) Date of Patent: *Nov. 15, 2022

(54) CONVEYOR BELT RUBBER COMPOSITION, METHOD FOR PRODUCING CONVEYOR BELT RUBBER COMPOSITION, CONVEYOR BELT, AND BELT CONVEYOR

(71) Applicant: THE YOKOHAMA RUBBER CO., LTD., Tokyo (JP)

(72) Inventors: Yu Shinke, Hiratsuka (JP); Deqing Zou, Hiratsuka (JP); Jun Miyaji, Hiratsuka (JP); Kazuya Uenishi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 444 days.

This patent is subject to a terminal disclaimer.

(21) Appl. No.: 16/487,291

(22) PCT Filed: Feb. 22, 2018

(86) PCT No.: PCT/JP2018/006446
§ 371 (c)(1),
(2) Date: Aug. 20, 2019

(87) PCT Pub. No.: WO2018/155554
PCT Pub. Date: Aug. 30, 2018

(65) Prior Publication Data
US 2019/0375873 A1 Dec. 12, 2019

(30) Foreign Application Priority Data

Feb. 22, 2017 (JP) .............................. JP2017-030986

(51) Int. Cl.
| | | |
|---|---|---|
| *C08F 236/10* | (2006.01) | |
| *B65G 15/32* | (2006.01) | |
| *C08C 19/22* | (2006.01) | |
| *C08K 5/057* | (2006.01) | |
| *C08K 5/56* | (2006.01) | |

(52) U.S. Cl.
CPC ............ *C08F 236/10* (2013.01); *B65G 15/32* (2013.01); *C08C 19/22* (2013.01); *C08K 5/057* (2013.01); *C08K 5/56* (2013.01)

(58) Field of Classification Search
CPC .................................................. C08F 236/10
See application file for complete search history.

(56) References Cited

U.S. PATENT DOCUMENTS

| | | | |
|---|---|---|---|
| 3,992,561 A | 11/1976 | Hargis et al. | |
| 5,262,213 A * | 11/1993 | Rodgers | ................... C08L 9/06 |
| | | | 525/98 |
| 6,103,842 A | 8/2000 | Halasa et al. | |
| 8,362,118 B2 * | 1/2013 | Mihara | .................. B60C 1/0016 |
| | | | 524/492 |
| 10,283,232 B2 * | 5/2019 | Keller | ................. B29C 71/0081 |
| 11,008,445 B2 * | 5/2021 | Uenishi | ................ C08K 5/3412 |
| 2003/0134999 A1 * | 7/2003 | Windisch | ................ C08F 36/04 |
| | | | 526/347 |
| 2015/0005433 A1 | 1/2015 | Furuhata | |
| 2016/0096684 A1 | 4/2016 | Sasakuma et al. | |
| 2018/0282446 A1 | 10/2018 | Uenishi et al. | |
| 2019/0023880 A1 | 1/2019 | Uenishi et al. | |
| 2019/0375872 A1 * | 12/2019 | Shinke | .................. B32B 15/043 |

FOREIGN PATENT DOCUMENTS

| | | | |
|---|---|---|---|
| JP | S54-065788 A | | 5/1979 |
| JP | S54-88986 A | | 7/1979 |
| JP | H10-306114 A | | 11/1998 |
| JP | 2006137897 A | * | 6/2006 |
| JP | 2013-107729 A | | 6/2013 |
| JP | 2014-205789 A | | 10/2014 |
| WO | 2017/043553 A1 | | 3/2017 |
| WO | 2017/145799 A1 | | 8/2017 |

OTHER PUBLICATIONS

Machine translation of JP 2006-137897 A, published Jun. 1, 2006.*
Office Action issued to the corresponding Australian Patent Application No. 2018224889 dated Jun. 3, 2020.
Office Action issued to the corresponding Japanese Patent Application No. 2019-501411 dated Feb. 12, 2020 with the English translation thereof.

* cited by examiner

*Primary Examiner* — Vickey Nerangis
(74) *Attorney, Agent, or Firm* — Carrier Blackman & Associates, P.C.

(57) ABSTRACT

An object of the present invention is to provide a conveyor belt rubber composition having excellent cut resistance and wear resistance, a method for producing the conveyor belt rubber composition, a conveyor belt formed using the conveyor belt rubber composition, and a belt conveyor equipped with the conveyor belt. The present invention relates to a conveyor belt rubber composition containing a diene rubber containing 50 mass % or more of an aromatic vinyl-conjugated diene copolymer, wherein the aromatic vinyl-conjugated diene copolymer has a content of repeating units derived from an aromatic vinyl of more than 20 mass %, and a proportion of a vinyl structure in repeating units derived from a conjugated diene of 8 mol % or less.

20 Claims, 1 Drawing Sheet

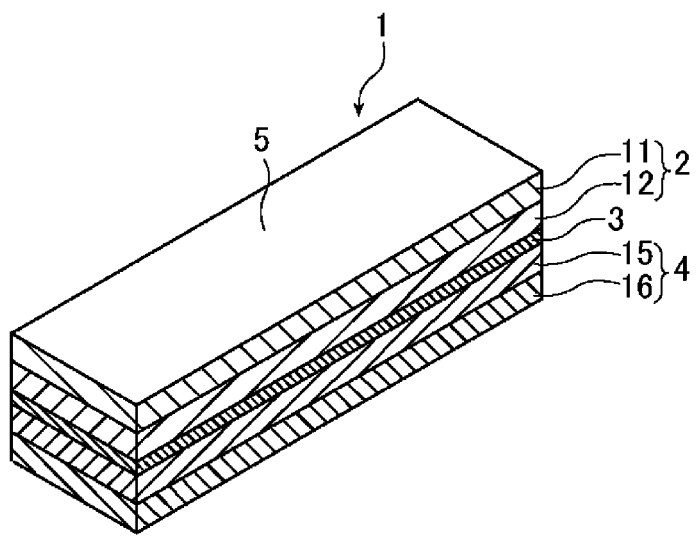

CONVEYOR BELT RUBBER COMPOSITION, METHOD FOR PRODUCING CONVEYOR BELT RUBBER COMPOSITION, CONVEYOR BELT, AND BELT CONVEYOR

TECHNICAL FIELD

The present invention relates to a conveyor belt rubber composition, a method for producing a conveyor belt rubber composition, a conveyor belt, and a belt conveyor.

BACKGROUND ART

Various characteristics such as cut resistance (difficulty to be ruptured when colliding with a sharp object) and wear resistance are required for belts (conveyor belts) of belt conveyors used to transport materials and the like.

As the rubber composition used for such a conveyor belt, for example, Patent Document 1 discloses a conveyor belt rubber composition containing natural rubber (NR) and styrene-butadiene rubber (SBR).

CITATION LIST

Patent Document

Patent Document 1: JP 2014-205789 A

SUMMARY OF INVENTION

Technical Problem

In recent years, with an increase in conveying capacity, the conveyor belt is required to have improved cut resistance and wear resistance.

Under the circumstance described above, the present inventors have investigated the conveyor belt rubber composition containing natural rubber and SBR using Examples in Patent Document 1 as a reference. It has been clearly found that even though the cut resistance and the wear resistance are at relatively high levels, further improvements thereof are desired in consideration of increase of a future request level.

In light of the circumstances described above, an object of the present invention is to provide a conveyor belt rubber composition having excellent cut resistance and wear resistance, a method for producing the conveyor belt rubber composition, a conveyor belt formed using the conveyor belt rubber composition, and a belt conveyor equipped with the conveyor belt.

Solution to Problem

As a result of diligent research on the above problems, the present inventors have found that the problems described above can be solved by using an aromatic vinyl-conjugated diene copolymer in which a content of repeating units derived from an aromatic vinyl and a proportion of a vinyl structure in repeating units derived from a conjugated diene are adjusted to specific ranges, and thus have completed the present invention.

Specifically, the present inventors have found that the problems described above can be solved by the following features.

(1) A conveyor belt rubber composition comprising a diene rubber containing 50 mass % or more of an aromatic vinyl-conjugated diene copolymer, wherein the aromatic vinyl-conjugated diene copolymer has a content of repeating units derived from an aromatic vinyl of more than 20 mass %, and a proportion of a vinyl structure in repeating units derived from a conjugated diene of 8 mol % or less.

(2) The conveyor belt rubber composition according to (1) above, wherein the aromatic vinyl-conjugated diene copolymer has a glass transition temperature of −50° C. or lower.

(3) The conveyor belt rubber composition according to (1) or (2) above, wherein the aromatic vinyl-conjugated diene copolymer has a proportion of a 1,4-cis structure in the repeating units derived from the conjugated diene of 17 mol % or more.

(4) The conveyor belt rubber composition according to (3) above, wherein the proportion of the 1,4-cis structure is 60 mol % or more.

(5) The conveyor belt rubber composition according to any one of (1) to (4) above, wherein the proportion of the vinyl structure is 5 mol % or less.

(6) The conveyor belt rubber composition according to any one of (1) to (5) above, wherein the aromatic vinyl-conjugated diene copolymer is terminally modified with at least one modifier selected from the group consisting of a titanium halide, a tin halide, a cyclic silazane, an alkoxysilane, an epoxide, an amine, a ketone, and a compound represented by the formula (N).

(7) A method for producing a conveyor belt rubber composition, the conveyor belt rubber composition containing a diene rubber containing 50 mass % or more of an aromatic vinyl-conjugated diene copolymer, the aromatic vinyl-conjugated diene copolymer having a content of repeating units derived from an aromatic vinyl of more than 20 mass %, and a proportion of a vinyl structure in repeating units derived from a conjugated diene of 8 mol % or less, the method comprising: copolymerizing monomers comprising an aromatic vinyl and a diene using an initiator prepared using an organolithium compound, an alkyl aluminum, and a metal alcoholate to produce the aromatic vinyl-conjugated diene copolymer.

(8) A method for producing a conveyor belt rubber composition, the conveyor belt rubber composition containing a diene rubber containing 50 mass % or more of an aromatic vinyl-conjugated diene copolymer, the aromatic vinyl-conjugated diene copolymer having a content of repeating units derived from an aromatic vinyl of more than 20 mass % and a proportion of a vinyl structure in repeating units derived from a conjugated diene of 8 mol % or less, and being terminally modified with at least one modifier selected from the group consisting of a titanium halide, a tin halide, a cyclic silazane, an alkoxysilane, an epoxide, an amine, a ketone, and a compound represented by the formula (N), the method comprising: copolymerizing monomers comprising an aromatic vinyl and a diene using an initiator prepared using an organolithium compound, an alkyl aluminum, and a metal alcoholate; and then terminating the polymerization using an electrophile selected from a titanium halide, a tin halide, a cyclic silazane, an alkoxysilane, an epoxide, an amine, a ketone, and a compound represented by the formula (N) to produce the aromatic vinyl-conjugated diene copolymer.

(9) A conveyor belt comprising an upper surface cover rubber layer, a reinforcing layer, and a lower surface cover rubber layer, wherein at least the upper surface cover rubber layer is formed using the conveyor belt rubber composition described in any one of (1) to (6) above.

(10) A belt conveyor equipped with the conveyor belt described in (9) above.

Advantageous Effects of Invention

As described below, according to the present invention, a conveyor belt rubber composition having excellent cut resistance and wear resistance, a method for producing the conveyor belt rubber composition, a conveyor belt formed using the conveyor belt rubber composition, and a belt conveyor equipped with the conveyor belt can be provided.

BRIEF DESCRIPTION OF DRAWINGS

FIG. 1 is a cross-sectional view schematically illustrating one example of a preferred embodiment of the conveyor belt of the present invention.

DESCRIPTION OF EMBODIMENTS

Hereinafter, a conveyor belt rubber composition, a method for producing the conveyor belt rubber composition, a conveyor belt formed using the conveyor belt rubber composition, and a belt conveyor equipped with the conveyor belt of the present invention will be described below.

In the present specification, numerical ranges indicated using "-" include the former numerical value and the later numerical value as the lower limit value and the upper limit value.

[I] Conveyor Belt Rubber Composition

A conveyor belt rubber composition of an embodiment of the present invention (hereinafter also referred to as "composition of an embodiment of the present invention") contains a diene rubber containing 50 mass % or more of an aromatic vinyl-conjugated diene copolymer.

Here, the aromatic vinyl-conjugated diene copolymer has a content of repeating units derived from an aromatic vinyl of more than 20 mass % and a proportion of the vinyl structure in repeating units derived from a conjugated diene of 8 mol % or less.

It is thought that the composition of an embodiment of the present invention has the composition described above, and thus the cut resistance and wear resistance are excellent. Although the reason is not clear, it can be considered that the aromatic vinyl-conjugated diene copolymer (hereinafter also referred to as "specific copolymer") has a very low proportion of the vinyl structure, and thus has a low glass transition temperature and a flexible structure, resulting in exhibition of the excellent cut resistance and wear resistance when formed into a conveyor belt.

The diene rubber contained in the composition of an embodiment of the present invention and optional components that may be contained in the composition of an embodiment of the present invention will be described below.

[1] Diene Rubber

The diene rubber contained in the composition of an embodiment of the present invention contains 50 mass % or more of a specific aromatic vinyl-conjugated diene copolymer (specific copolymer) described below.

The content of the specific copolymer in the diene rubber is preferably 60 mass % or more, because the effects of the present invention are more excellent. The upper limit thereof is not particularly limited, i.e., 100 mass %, and the content is preferably 90 mass % or less and more preferably 80 mass % or less, because the effects of the present invention are more excellent.

Specific Copolymer

The specific copolymer is an aromatic vinyl-conjugated diene copolymer (a copolymer of an aromatic vinyl and a conjugated diene). Here, the content of repeating units derived from the aromatic vinyl is more than 20 mass %. The proportion of the vinyl structure in repeating units derived from the conjugated diene is 8 mol % or less.

The specific copolymer is preferably a solution polymerization type copolymer (in particular, a solution polymerization type SBR), because the effects of the present invention are more excellent.

Monomer

The specific copolymer is a copolymer of an aromatic vinyl and a conjugated diene. That is, the specific copolymer is a copolymer obtained by copolymerizing an aromatic vinyl with a conjugated diene. The specific copolymer may be a copolymer in which another monomer is further copolymerized, in addition to the aromatic vinyl and conjugated diene.

(1) Aromatic Vinyl

The aromatic vinyl is not particularly limited, and examples thereof may include, styrene, α-methyl styrene, 2-methyl styrene, 3-methyl styrene, 4-methyl styrene, 2-ethyl styrene, 3-ethyl styrene, 4-ethyl styrene, 2,4-diisopropyl styrene, 2,4-dimethyl styrene, 4-t-butyl styrene, 5-t-butyl-2-methyl styrene, vinyl naphthalene, dimethylaminomethyl styrene, and dimethylaminoethyl styrene. Among these, styrene, α-methyl styrene, and 4-methyl styrene are preferable, and styrene is more preferable, because the effects of the present invention are more excellent. The aromatic vinyl monomers may be used alone, or in a combination of two or more thereof.

The content of repeating units derived from the aromatic vinyl in the specific copolymer (hereinafter also referred to as "aromatic vinyl content") is more than 20 mass %. Especially, the content is preferably from 21 to 50 mass %, more preferably from 22 to 40 mass %, and still more preferably 23 to 30 mass %, because the effects of the present invention are more excellent.

(2) Conjugated Diene

The conjugated diene is not particularly limited, and examples thereof may include butadiene (e.g., 1,3-butadiene), isoprene, and chloroprene. Especially, 1,3-butadiene and isoprene are preferable because the effects of the present invention are more excellent. The conjugated dienes may be used alone, or in a combination of two or more thereof.

The content of repeating units derived from the conjugated diene in the specific copolymer is preferably 30 mass % or more, more preferably 50 mass % or more, and still more preferably 70 mass % or more, because the effects of the present invention are more excellent. The upper limit thereof is not particularly limited, and the content is preferably less than 80 mass % and more preferably 75 mass % or less, because the effects of the present invention are more excellent.

(3) Other Monomers

As described above, the specific copolymer may be a copolymer in which another monomer is further copolymerized, in addition to the aromatic vinyl and conjugated diene. Examples of the other monomer may include α,β-unsaturated nitriles such as acrylonitrile and methacrylonitrile; unsaturated carboxylic acids and acid anhydrides thereof such as acrylic acid, methacrylic acid, and maleic anhydride; unsaturated carboxylates such as methyl methacrylate, ethyl acrylate, and butyl acrylate; and non-conjugated dienes such as 1,5-hexadiene, 1,6-heptadiene, 1,7-octadiene, dicyclopentadiene, and 5-ethylidene-2-norbornene.

Microstructure (1) Vinyl Structure

In the specific copolymer, the proportion of the vinyl structure in repeating units derived from the conjugated diene (hereinafter also referred to simply as "proportion of the vinyl structure") is 8 mol % or less. Especially, the proportion is preferably 7 mol % or less, more preferably 6 mol % or less, and still more preferably 5 mol % or less, because the effects of the present invention are more excellent. The lower limit is not particularly limited and is 0 mol %.

Here, "proportion of the vinyl structure" refers to a proportion (mol %) of the repeating units including a vinyl structure (for example, 1,2-vinyl structure when the conjugated diene is 1,3-butadiene) in all the repeating units derived from the conjugated diene.

(2) 1,4-Trans Structure

In the specific copolymer, the proportion of a 1,4-trans structure in the repeating units derived from the conjugated diene (hereinafter also referred to simply as "proportion of the 1,4-trans structure") is not particularly limited, and is preferably 75 mol % or less, because the effects of the present invention are more excellent. Especially, the proportion is preferably 70 mol % or less, more preferably less than 70 mol %, and still more preferably 60 mol % or less, because the effects of the present invention are more excellent. The lower limit thereof is not particularly limited, and the proportion is preferably 10 mol % or more, more preferably 20 mol % or more, and still more preferably 30 mol % or more, because the effects of the present invention are more excellent.

Here, "proportion of the 1,4-trans structure" refers to a proportion (mol %) of the repeating units including the 1,4-trans structure in all the repeating units derived from the conjugated diene.

(3) 1,4-Cis Structure

In the specific copolymer, the proportion of a 1,4-cis structure in the repeating units derived from the conjugated diene (hereinafter also referred to simply as "proportion of the 1,4-cis structure") is not particularly limited, and it is preferably from 10 to 92 mol % and more preferably from 17 to 90 mol %. Especially, the proportion is preferably from 20 to 88 mol %, more preferably from 25 to 85 mol %, still more preferably from 30 to 80 mol %, and particularly preferably from 40 to 75 mol %, because the effects of the present invention are more excellent.

Here, "proportion of the 1,4-cis structure" refers to a proportion (mol %) of the repeating units including the 1,4-cis structure in all the repeating units derived from the conjugated diene.

Note that "proportion (mol %) of the vinyl structure, proportion (mol %) of 1,4-trans structure, and proportion (mol %) of 1,4-cis structure" in the repeating units derived from the conjugated diene are also expressed as "vinyl/trans/cis".

The repeating units derived from the conjugated diene consist of the vinyl structure, the 1,4-trans structure and the 1,4-cis structure, and thus the total of the proportions (mol %) of the structures is 100 mol %.

Glass Transition Temperature

The glass transition temperature (Tg) of the specific copolymer is not particularly limited, and is preferably −50° C. or lower and more preferably −60° C. or lower, because the effects of the present invention are more excellent. Especially, it is preferably −70° C. or lower and more preferably −80° C. or lower, because the effects of the present invention are more excellent. The lower limit thereof is not particularly limited, and the glass transition temperature is preferably −100° C. or higher and more preferably −90° C. or higher, because the effects of the present invention are more excellent.

Note that in the present specification, the glass transition temperature (Tg) is obtained by measurement using a differential scanning calorimeter (DSC) at a temperature increase rate of 20° C./minute and calculation according to a midpoint method.

Molecular Weight

The molecular weight of the specific copolymer is not particularly limited, and the weight average molecular weight (Mw) is preferably from 1,000 to 10,000,000, more preferably from 2,000 to 5,000,000, and still more preferably from 3,000 to 2,000,000, because the effects of the present invention are more excellent. The number average molecular weight (Mn) is preferably from 500 to 5,000,000, more preferably from 1,000 to 2,500,000, still more preferably from 1,500 to 1,000,000, and particularly preferably from 200,000 to 1,000,000 because the effects of the present invention are more excellent.

In the present specification, the number average molecular weight (Mn) and the weight average molecular weight (Mw) are standard polystyrene equivalents obtained from measurement by a gel permeation chromatography (GPC) under the following conditions.

Eluent: Tetrahydrofuran

Detector: RI detector

PREFERRED EMBODIMENT

Preferred embodiments of the specific copolymer may include copolymers that are terminally modified with at least one modifier selected from the group consisting of a titanium halide, a tin halide, a cyclic silazane, an alkoxysilane, an epoxide, an amine, a ketone, and a compound represented by the formula (N) described below (hereinafter also referred to as "specific modifier"). In the above embodiment, the effects of the present invention are more excellent.

Note that when the specific modifier is the titanium halide, tin halide, or compound represented by the formula (N) described below, it is presumed that the terminal end of the specific copolymer interacts with carbon black; when the specific modifier is the cyclic silazane, alkoxysilane or amine, it is presumed that the terminal end of the specific copolymer interacts with silica; and when the specific modifier is the epoxide or ketone, it is presumed that the terminal end of the specific copolymer interacts with silica or carbon black.

The specific modifier is preferably the cyclic silazane, alkoxysilane, or compound represented by formula (N) described below, and more preferably the compound represented by formula (N) described below, because the effects of the present invention are more excellent.

Specific Modifier

The specific modifiers will be described below.

(1) Titanium Halide

The titanium halide is not particularly limited, and examples thereof may include $TiCl_3$, $TiBr_3$, $Ti(OC_2H_5)Cl_2$, $Ti(OC_4H_9)Cl_2$, $TiCl_4$, $Ti(OC_2H_5)Cl_3$, and $Ti(OC_4H_9)Cl_3$. Especially, $TiCl_3$ (trichlorotitanium) and $TiCl_4$ (tetrachlorotitanium) are preferable, and tetrachlorotitanium is more preferable, because the effects of the present invention are more excellent.

(2) Tin Halide

The tin halide is not particularly limited, and examples thereof may include tin fluoride, tin chloride, tin bromide, tin iodide, and tin astatide.

(3) Cyclic Silazane

The cyclic silazane is not particularly limited as long as it is a ring type silazane.

Here, "silazane" refers to a compound having a structure in which a silicon atom and a nitrogen atom are directly bonded to each other (a compound having an Si—N bond).

The cyclic silazane is preferably a compound represented by the following formula (S), because the effects of the present invention are more excellent.

[Chemical Formula 1]

In the formula (S) above, $R_1$ to $R_3$ each independently represent a hydrogen atom or a substituent. Specific examples of the substituent are the same as R in the formula (P) described below.

The $R_1$ is preferably an alkyl group (preferably having 1 to 10 carbon atoms), an alkylsilyl group (preferably having 1 to 10 carbon atoms), or an aromatic hydrocarbon group (preferably having 6 to 18 carbon atoms), because the effects of the present invention are more excellent.

$R_2$ is preferably an alkoxy group (preferably having 1 to 10 carbon atoms), because the effects of the present invention are more excellent.

In the formula (S) above, L represents a divalent organic group.

Examples of the divalent organic group may include substituted or unsubstituted aliphatic hydrocarbon groups (e.g., alkylene groups, preferably having 1 to 8 carbon atoms), substituted or unsubstituted aromatic hydrocarbon groups (e.g., arylene groups, preferably having 6 to 12 carbon atoms), —O—, —S—, —$SO_2$—, —N(R)— (R: an alkyl group), —CO—, —NH—, —COO—, —CONH—, or combined group thereof (e.g., alkyleneoxy groups (—$C_mH_{2m}O$—: m is a positive integer), alkyleneoxycarbonyl groups, and alkylenecarbonyloxy groups).

L is preferably the alkylene group (preferably having 1 to 10 carbon atoms), because the effects of the present invention are more excellent.

Examples of the compound represented by the formula (S) may include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, and N-trimethylsilyl-1,1-diethoxy-2-azasilacyclopentane.

Note that it is considered that the silicon atom in the cyclic silazane has electrophilicity.

(4) Alkoxysilane

The alkoxysilane is not particularly limited as long as it is a compound having an alkoxysilyl group, and examples thereof may include tetramethoxysilane, methyltrimethoxysilane, dimethyldimethoxysilane, tetraethoxysilane, methyltriethoxysilane, dimethyldiethoxysilane, phenyltrimethoxysilane, diphenyldimethoxysilane, phenyltriethoxysilane, diphenyldiethoxysilane, hexyltrimethoxysilane, hexyltriethoxysilane, 3-glycidoxypropyltrimethoxysilane, 3-glycidoxypropyltriethoxysilane, 3-glycidoxypropylmethyldimethoxysilane, N,N-bis(trimethylsilyl)-3-aminopropyltrimethoxysilane, and N,N-bis(trimethylsilyl)-3-aminopropyltriethoxysilane.

The number of the alkoxy groups in the alkoxysilyl group is not particularly limited, and is preferably two or more, because the effects of the present invention are more excellent.

Note that it is considered that the silicon atom in the alkoxysilane has electrophilicity.

(5) Epoxide

The epoxide is not particularly limited as long as it is a compound having an oxacyclopropane (oxirane) structure.

Specific examples of the epoxide may include ethylene oxide, propylene oxide, butylene oxide, cyclohexene oxide, styrene oxide, 1-phenylpropylene oxide, methyl glycidyl ether, ethyl glycidyl ether, glycidyl isopropyl ether, butyl glycidyl ether, 1-methoxy-2-methylpropylene oxide, allyl glycidyl ether, 2-ethyloxyl glycidyl ether, phenyl glycidyl ether, p-tert-butylphenyl glycidyl ether, lauryl alcohol glydicyl ether, stearyl glycidyl ether, palmityl glycidyl ether, myristyl glycidyl ether, lauryl glycidyl ether, capryl glycidyl ether, and caproyl glycidyl ether.

(6) Amine

The amine is not particularly limited as long as it is a compound having an amino group (—$NR_2$: R represents a hydrogen atom or a hydrocarbon group, and two R groups may be the same or different). Especially, aziridine is preferable, because the effects of the present invention are more excellent. Examples of the aziridine may include N-methyl aziridine, N-ethyl aziridine, N-isopropyl aziridine, N-phenyl aziridine, N-(4-methylphenyl) aziridine, and N-methyl-2-methylaziridine.

(7) Ketone

The ketone is not particularly limited as long as it is a compound having a ketone group (—CO—).

Specific examples of the ketone may include acetone, benzophenone, and derivatives thereof.

Examples of the derivatives of benzophenones may include N,N,N',N'-tetramethyl-4,4'-diaminobenzophenone, N,N,N',N'-tetraethyl-(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, and 4,4'-diacetylbenzophenone.

(8) Compound Represented by Formula (N)

The compound represented by the formula (N) will be described below.

[Chemical Formula 2]

In the formula (N), $R^1$ represents a hydrogen atom or an alkyl group (preferably having 1 to 10 carbon atoms), and $R^2$ represents an alkylene group (preferably having 2 to 10 carbon atoms).

Specific examples of the compound represented by the formula (N) above may include N-methyl pyrrolidone (in the formula (N) above, $R_1$ is a methyl group, and $R_2$ is a propylene group).

Method for Producing Specific Copolymer

The method for producing the specific copolymer described above is not particularly limited, and known methods can be used. Methods of adjusting the content of the aromatic vinyl, the proportion of the microstructure, the glass transition temperature, and the molecular weight to specific ranges are not particularly limited, examples thereof may include methods in which a type of the monomer to be polymerized, an amount ratio of the monomers, a type of the initiator, an amount ratio of the initiator, or a reaction temperature is adjusted.

PREFERRED EMBODIMENT

The preferred embodiment of the method for producing the specific copolymer may include, for example, a method (hereinafter also referred to as "method of an embodiment of the present invention") in which monomers including the aromatic vinyl and the diene are copolymerized using an initiator (hereinafter, also referred to as "specific initiator") prepared using an organolithium compound, an alkyl aluminum, and a metal alcoholate. When the method described above is used, the obtained composition of an embodiment of the present invention, containing the specific copolymer, exhibits more excellent cut resistance and wear resistance.

Specific Initiator

As described above, in the method of an embodiment of the present invention, the initiator (specific initiator) prepared using the organolithium compound, the alkyl aluminum, and the metal alcoholate is used. It is considered that in the method of an embodiment of the present invention, the use of the specific initiator reduces the proportion of the vinyl structure in the repeating units derived from the dienes (for example, 8 mol % or less) in the specific copolymer.

The specific initiator is preferably an initiator further containing an aromatic divinyl, because the effects of the present invention are more excellent. The initiator prepared using the organolithium compound, the alkyl aluminum, the metal alcoholate, and the aromatic divinyl is preferable. When the aromatic divinyl is used, the obtained copolymer is branched, the molecular weight increases, and the cut resistance and the wear resistance are further improved.

(1) Organolithium Compound

Examples of the organolithium compound may include mono-organolithium compounds such as n-butyl lithium, sec-butyl lithium, tert-butyl lithium, n-propyl lithium, isopropyl lithium, and benzyl lithium; and polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. The mono-organolithium compounds, such as n-butyl lithium, sec-butyl lithium, and tert-butyl lithium, are particularly preferable, because the effects of the present invention are more excellent.

The amount of the organolithium compound used in the preparation of the specific initiator is not particularly limited, and it is preferably from 0.001 to 10 mol % relative to the monomers to be polymerized, because the effects of the present invention are more excellent.

(2) Alkyl Aluminum

The alkyl aluminum is not particularly limited as long as it is a compound in which an alkyl group (linear, branched, or cyclic) is bonded to an aluminum atom (Al). The number of carbon atoms in the alkyl group is not particularly limited, and it is preferably from 1 to 20 and more preferably from 1 to 10, because the effects of the present invention are more excellent. Specific examples of the alkyl aluminum may include trimethyl aluminum, triethyl aluminum, triisopropyl aluminum, tributyl aluminum, triisobutyl aluminum, tripropyl aluminum, tributyl aluminum, triisobutyl aluminum, pentyldiethyl aluminum, 2-methylpentyl-diethyl aluminum, dicyclohexylethyl aluminum, tripentyl aluminum, trihexyl aluminum, trioctyl aluminum, tri(2-ethylhexyl)aluminum, tricyclohexyl aluminum, tricyclopentyl aluminum, tri(2,2,4-trimethylpentyl)aluminum, tridodecyl aluminum, tri(2-methylpentyl)aluminum, diisobutyl aluminum hydride, diethyl aluminum hydride, dipropyl aluminum hydride, propyl aluminum dihydride, and isobutyl aluminum dihydride. Especially, trioctylaluminum is preferable because the effects of the present invention are more excellent.

The ratio of the alkyl aluminum to the organolithium compound used in the preparation of the specific initiator is not particularly limited, and it is preferably from 0.1 to 50 molar equivalents and more preferably from 0.5 to 10 molar equivalents, because the effects of the present invention are more excellent. Here, "one molar equivalent" indicates that the alkyl aluminum is added in an amount of one mole when one mole of the organolithium compound is used. The ratio of the alkyl aluminum to the organolithium compound used in the preparation of the specific initiator, accordingly, is not particularly limited, and the proportion is preferably from 10 to 5000 mol % and more preferably from 50 to 1000 mol %, because the effects of the present invention are more excellent.

(3) Metal Alcoholate

The metal alcoholate (metal alkoxide) is not particularly limited as long as it is a compound in which hydroxyl hydrogen in the alcohol is substituted with a metal.

The metal is not particularly limited, and examples thereof may include alkali metals, alkaline earth metals, transition metals (metals of Group III to Group XI), aluminum, germanium, tin, and antimony. Especially, the alkaline earth metals are preferable, and barium is more preferably, because the effects of the present invention are more excellent.

The alcohol is not particularly limited as long as it is a compound in which the hydrogen atom in the linear, branched, or cyclic hydrocarbon is substituted with a hydroxy group. The number of carbon atoms in the alcohol is not particularly limited, and it is preferably from 1 to 30 and more preferably from 1 to 20, because the effects of the present invention are more excellent.

The metal alcoholate is preferably a barium alcoholate (barium alkoxide), because the effects of the present invention are more excellent. Examples of the barium alkoxide may include barium dimethoxide, barium diethoxide, barium dipropoxide, barium dibutoxide, and barium bis(2-ethylhexoxide).

The ratio of the metal alcoholate to the organolithium compound used in the preparation of the specific initiator is not particularly limited, and is preferably from 0.01 to 5 molar equivalents and more preferably from 0.1 to 3 molar equivalents, because the effects of the present invention are more excellent. Here, "one molar equivalent" indicates that the metal alcoholate is added in an amount of one mole when one mole of the organolithium compound is used. The ratio of the metal alcoholate to the organolithium compound used in the preparation of the specific initiator is not particularly limited, and is preferably from 1 to 500 mol % and more preferably from 10 to 300 mol %, because the effects of the present invention are more excellent.

(4) Aromatic Divinyl

The aromatic divinyl is not particularly limited as long as it is an aromatic compound having two vinyl groups. Especially, divinyl benzene is preferable, because the effects of the present invention are more excellent.

The ratio of the aromatic divinyl to the organolithium compound used in the preparation of the specific initiator is not particularly limited, and is preferably from 0.1 to 5 molar equivalents and more preferably from 0.3 to 3 molar equivalents, because the effects of the present invention are more excellent. Here, "one molar equivalent" indicates that the aromatic divinyl is added in an amount of one mole when one mole of the organolithium compound is used. The ratio of the aromatic divinyl to the organolithium compound used in the preparation of the specific initiator, accordingly, is not particularly limited, and is preferably from 10 to 500 mol % and more preferably from 30 to 300 mol %, because the effects of the present invention are more excellent.

Method for Preparing Specific Initiator

The method for preparing the specific initiator is not particularly limited, and examples thereof may include a method in which the organolithium compound, the alkyl aluminum, the metal alcoholate, and the like are dissolved in a solvent.

The type of solvent is not particularly limited and, for example, organic solvents can be used. The solvent is preferably solvents other than alcohols because the effects of the present invention are more excellent.

Monomer

The monomers (mixture) include the aromatic vinyl and the diene. Specific examples and preferred aspects of the aromatic vinyl and the diene are described above.

The proportion of the aromatic vinyl in the monomers is not particularly limited, and it is preferably more than 20 mass %, preferably from 21 to 50 mass %, more preferably from 22 to 40 mass %, and still more preferably from 23 to 30 mass %, because the effects of the present invention are more excellent.

The proportion of the diene in the monomers is not particularly limited, and it is preferably 30 mass % or more, more preferably 50 mass % or more, and still more preferably 70 mass % or more, because the effects of the present invention are more excellent. The upper limit thereof is not particularly limited, and the content is preferably less than 80 mass % and more preferably 75 mass % or less, because the effects of the present invention are more excellent.

The monomers may include another monomer in addition to the aromatic vinyl and the diene. Specific examples of such a monomer are the same as the "other monomers" described above.

Copolymerization of Monomers

As discussed above, in the method of an embodiment of the present invention, the monomers including the aromatic vinyl and the diene are copolymerized using the specific initiator. The specific initiator and the monomers are described above.

The copolymerization method of the monomers is not particularly limited, and may include a method in which the monomers described above are added to an organic solvent solution containing the specific initiator described above, and the mixture is stirred at a temperature of from 0 to 120° C. (preferably from 30 to 100° C.), and the like.

The ratio of the organolithium compound in the specific initiator to the monomers is not particularly limited and is preferably from 0.001 to 10 mol %, because the effects of the present invention are more excellent.

When the monomers are copolymerized, a phenol compound or an amine compound may be added to the copolymerization system (for example, the organic solvent solution containing the specific initiator described above). Especially, the phenol compound is preferable, because the effects of the present invention are more excellent. When the phenol compound is added, the proportion of the 1,4-cis structure is increased in the repeating units derived from the diene in the obtained aromatic vinyl-diene copolymer.

Here, the phenol compound refers to a compound having a phenolic hydroxyl group or a metal salt thereof. The amine compound refers to a compound having an amino group (—$NH_2$, —NHR, and —$NR_2$). Here, R represents a substituent. Specific examples and preferred aspects of the substituent are the same as those of R in the formula (P) described below. Note that two R groups in —$NR_2$ may be the same or different.

Examples of the phenol compound may include, for example, compounds represented by the following formula (P).

[Chemical Formula 3]

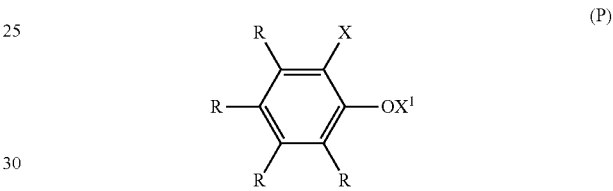

(P)

In the formula (P) above, $X^1$ represents a hydrogen atom or a metal atom. Examples of the metal atom may include sodium atom and potassium atom.

In the formula (P) above, R represents a hydrogen atom or a substituent. Note that the plurality of R groups may be the same or different.

The substituent is not particularly limited as long as it is a monovalent substituent. Specific examples thereof include hydrocarbon groups that may have a halogen atom, hydroxy group, nitro group, carboxy group, alkoxy group, amino group, mercapto group, acyl group, imide group, phosphino group, phosphinyl group, silyl group, or hetero atom.

Examples of the halogen atom may include a fluorine atom, chlorine atom, bromine atom, and iodine atom.

Examples of the hetero atom in the hydrocarbon group that may have a hetero atom may include an oxygen atom, nitrogen atom, sulfur atom, and phosphor atom.

Examples of the hydrocarbon group that may have a hetero atom may include aliphatic hydrocarbon groups, aromatic hydrocarbon groups, and combined groups thereof.

The aliphatic hydrocarbon group may be linear, branched, or cyclic. Specific examples of the aliphatic hydrocarbon group may include linear or branched alkyl groups (especially, those having 1 to 30 carbon atoms), linear or branched alkenyl groups (especially, those having 2 to 30 carbon atoms), and linear or branched alkynyl groups (especially, those having 2 to 30 carbon atoms).

Examples of the aromatic hydrocarbon group may include aromatic hydrocarbon groups having 6 to 18 carbon atoms, such as a phenyl group, tolyl group, xylyl group, and naphthyl group.

In the formula (P) above, X represents a hydrogen atom, an —$OX^1$ group or a substituent. $X^1$ is those as described above. The specific examples of the substituent are the same as those of R in the formula (P) above.

The amount of the phenol compound added is not particularly limited, and is preferably from 0.01 to 90 mol % and more preferably from 0.1 to 80 mol %, relative to the organolithium compound describe above, because the effects of the present invention are more excellent.

The method of terminating the polymerization is not particularly limited, and may include a method in which an alcohol (in particular methanol) is added to the polymerization solution.

The method of terminating the polymerization is preferably a method using an electrophile (hereinafter also referred to as "specific electrophile") selected from titanium halides, tin halides, cyclic silazanes, alkoxysilanes, epoxides, amines, ketones, and compounds represented by the formula (N) below to terminate the polymerization, because the effects of the present invention are more excellent.

The method of an embodiment of the present invention, accordingly, preferably uses the specific initiator to copolymerize the monomers including the aromatic vinyl and the diene, and thereafter uses the specific electrophile to terminate the polymerization.

The definition, specific examples, and preferred aspects of the specific electrophile are the same as the specific modifier described above.

By terminating the polymerization using the specific electrophile, the copolymer that is terminally modified with the specific electrophile (specific modifier) is obtained.

The amount of the specific electrophile relative to the specific initiator is not particularly limited, and the ratio of the electrophile to the organolithium compound (specific electrophile/organolithium compound) is preferably from 0.1 to 10 and more preferably from 1 to 5 in a molar ratio, because the effects of the present invention are more excellent.

The ratio of the specific electrophile to the alkyl aluminum (alkyl Al) (specific electrophile/alkyl Al) is preferably from 0.1 to 10 and more preferably from 1 to 5 in a molar ratio, because the effects of the present invention are more excellent.

The ratio of the electrophile to the metal alcoholate (electrophile/metal alcoholate) is preferably from 0.1 to 20 and more preferably from 1 to 10 in a molar ratio, because the effects of the present invention are more excellent.

Other Rubber Component

The diene rubber may contain rubber components other than the specific copolymer. Examples of the other rubber component may include natural rubber (NR), isoprene rubber (IR), butadiene rubber (BR), styrene-butadiene rubber (SBR) other than the specific copolymer, acrylonitrile-butadiene copolymer rubber (NBR), butyl rubber (IIR), halogenated butyl rubber (Br-IIR, Cl-IIR), and chloroprene rubber (CR). Especially, the natural rubber (NR) is preferable, because the effects of the present invention are more excellent.

The content of the other rubber component (for example, natural rubber) in the diene rubber is not particularly limited, and is preferably 50 mass % or less and more preferably 40 mass % or less, because the effects of the present invention are more excellent. The lower limit is not particularly limited, and it is preferably 10 mass % or more because the effects of the present invention are more excellent.

[2] Optional Component

In addition to the components described above, the composition of an embodiment of the present invention may contain other components (optional components) such as carbon black, silica, silane coupling agents, vulcanizing agents, vulcanization accelerators, vulcanization aids, vulcanization retarders, oil, and various compounding agents.

Carbon Black

The composition of an embodiment of the present invention preferably contains carbon black, because the effects of the present invention are more excellent.

Examples of the carbon black may include ISAF (Intermediate Super Abrasion Furnace) grade, HAF (High Abrasion Furnace) grade, SAF (Super Abrasion Furnace) grade, FEF (Fast Extruding Furnace) grade, GPF (General Purpose Furnace) grade, SRF (Semi-Reinforcing Furnace) grade, FT (Fine Thermal) grade, and MT (Medium Thermal) grade carbon blacks. Especially, ISAF grade carbon black is preferable, because the effects of the present invention are more excellent In the composition of an embodiment of the present invention, the content of the carbon black is not particularly limited, and is preferably from 20 to 80 parts by mass and more preferably from 40 to 70 parts by mass, based on 100 parts by mass of the diene rubber, because the effects of the present invention are more excellent. The carbon black may be used alone or in a combination of two or more types thereof.

Silica

The composition of an embodiment of the present invention preferably contains silica, because the effects of the present invention are more excellent.

The silica is not particularly limited, and examples thereof may include fumed silica, calcined silica, precipitated silica, pulverized silica, molten silica, silicic anhydride fine particles, hydrous silicic acid fine particles, hydrated aluminum silicate, and hydrated calcium silicate. The silica may be used alone or in a combination of two or more types thereof.

In the composition of an embodiment of the present invention, the content of the silica is not particularly limited, and is preferably from 1 to 50 parts by mass and more preferably from 2 to 20 parts by mass, based on 100 parts by mass of the diene rubber, because the effects of the present invention are more excellent.

Silane Coupling Agent

The silane coupling agent is not particularly limited, and it is preferable to use a polysulfide-based silane coupling agent used for rubber.

Specific examples of the polysulfide-based silane coupling agents may include, for example, bis(3-triethoxysilylpropyl)tetrasulfide and bis(3-(triethoxysilyl)propyl)disulfide.

Vulcanizing Agent

The composition of an embodiment of the present invention preferably contains a vulcanizing agent, because the effects of the present invention are more excellent.

The vulcanizing agent is not particularly limited, and examples thereof may include sulfur, organic peroxide-based vulcanizing agents, metal oxide-based vulcanizing agents, disulfide-based vulcanizing agents, phenol resins, and quinone dioxime.

Examples of the sulfur may include powdered sulfur, precipitated sulfur, highly dispersible sulfur, surface treated sulfur, insoluble sulfur, dimorpholine disulfide, and alkylphenol disulfide.

Specific examples of the organic peroxide-based vulcanizing agent may include benzoyl peroxide, t-butyl hydroperoxide, 2,4-dichlorobenzoyl peroxide, 2,5-dimethyl-2,5-di(t-butylperoxy)hexane, and 2,5-dimethylhexane-2,5-di(peroxyl benzoate).

Examples of the other vulcanizing agents may include magnesium oxide, litharge, p-quinone dioxime, p-dibenzoylquinonedioxime, poly-p-dinitrosobenzene, and methylenedianiline.

Vulcanization Accelerator

The composition of an embodiment of the present invention preferably contains a vulcanization accelerator, because the effects of the present invention are more excellent.

Examples of the vulcanization accelerator may include thiuram-based, aldehyde-ammonia-based, guanidine-based, thiourea-based, thiazole-based, sulfenamide-based, and dithiocarbamate-based vulcanization accelerators.

Examples of the thiuram-based vulcanization accelerator may include tetramethylthiurammonosulfide (TS), tetramethylthiuram disulfide (TMTD), and dipentamethylenethiuramtetrasulfide.

Specific examples of the aldehyde-ammonia-based vulcanization accelerator may include hexamethylene tetramine (H).

Specific examples of the guanidine-based vulcanization accelerator may include diphenyl guanidine.

Specific examples of the thiourea-based vulcanization accelerator may include ethylene thiourea.

Specific examples of the thiazole-based vulcanization accelerator may include dibenzothiazyl disulfide (DM), and 2-mercaptobenzothiazole and zinc salts thereof.

Specific examples of the sulfenamide-based vulcanization accelerator may include N-cyclohexyl-2-benzothiazolyl sulfenamide (CZ) and N-t-butyl-2-benzothiazolyl sulfenamide (NS).

Specific examples of the dithiocarbamate-based vulcanization accelerator include Na-dimethylditiocarbamate, Zn-dimethylditiocarbamate, Te-diethylditiocarbamate, Cu-dimethylditiocarbamate, Fe-dimethylditiocarbamate, and pipecholinepipecholylditiocarbamate.

Especially, the thiuram-based vulcanization accelerator and the sulfenamide-based vulcanization accelerator are preferable.

The vulcanization accelerators may be used alone, or in a combination of two or more types thereof.

Note that when the two or more types of vulcanization accelerators are used, the content of the vulcanization accelerators is the total content of all of the vulcanization accelerators.

Vulcanization Aid

The composition of an embodiment of the present invention preferably contains the vulcanization aid, because the effects of the present invention are more excellent.

As the vulcanization aid, common aids for rubbers may be used in combination. Examples thereof may include zinc oxide, stearic acid, oleic acid, and zinc salts thereof.

Vulcanization Retarder

Specific examples of the vulcanization retarder may include organic acids such as phthalic anhydride, benzoic acid, salicylic acid, and acetylsalicylic acid; nitroso compounds such as N-nitroso-diphenylamine, N-nitroso-phenyl-β-naphthylamine, and N-nitroso-trimethyl-dihydroquinoline polymers; halides such as trichloromelanine; 2-mercaptobenzimidazole; and Santogard PVI.

Compounding Agent

Examples of the compounding agents may include fillers other than the carbon black and the silica, resins, anti-aging agents, oil, antioxidants, pigments (dyes), plasticizers, thixotropic agents, UV absorbents, flame retardants, solvents, surfactants (including leveling agents), dispersants, dehydrating agents, anticorrosive agents, adhesion promoters, antistatic agents, and processing aid.

For these compounding agents, agents generally used for a rubber composition can be used. The amount thereof is not particularly limited and can be selected as appropriate.

[3] Method for Producing Conveyor Belt Rubber Composition

The method of producing the composition of an embodiment of the present invention is not particularly limited, and specific examples thereof may include a method in which the components described above are kneaded using a well known method and device (e.g., Banbury mixer, kneader, and roll). Especially, the components other than the vulcanizing agent and the vulcanization accelerator are preferably blended first at a high temperature (preferably from 40 to 160° C.) and cooled, and then the vulcanizing agent and the vulcanization accelerator are blended therewith.

The composition of an embodiment of the present invention can be vulcanized or crosslinked under a known vulcanizing or crosslinking conditions.

[II] Conveyor Belt

Next, the conveyor belt of an embodiment of the present invention will be described below.

The conveyor belt of an embodiment of the present invention is a conveyor belt formed using the conveyor belt rubber composition of an embodiment of the present invention.

The rubber composition used in the conveyor belt of an embodiment of the present invention is not particularly limited as long as it is the conveyor belt rubber composition of an embodiment of the present invention as described above.

For the conveyor belt of an embodiment of the present invention, one preferable aspect is a conveyor belt including an upper surface cover rubber layer, a reinforcing layer, and a lower surface cover rubber layer.

The number of layers forming the upper surface cover rubber layer may be one or more. The number may be two. For example, the layer may include an outer layer serving as an object transportation conveying face and an inner layer as an adhesive layer. The same applies to the lower surface cover rubber layer.

When the upper surface cover rubber layer is formed of multiple layers, rubber compositions forming the layers in the upper surface cover rubber layer may be the same or different. The same applies to the lower surface cover rubber layer.

The conveyor belt of an embodiment of the present invention is preferably a conveyor belt in which at least the upper surface cover rubber layer is formed using the conveyor belt rubber composition of an embodiment of the present invention described above.

Each layer will be described below.

[1] Upper Surface Cover Rubber Layer

As described above, one preferable aspect is an aspect in which the upper surface cover rubber layer is formed from the conveyor belt rubber composition of an embodiment of the present invention. It is also preferable that at least the surface of the upper surface cover rubber layer is formed from the conveyor belt rubber composition of an embodiment of the present invention. When the upper surface cover rubber layer of the conveyor belt of an embodiment of the present invention is formed from the conveyor belt rubber composition of an embodiment of the present invention, the effects of the present invention are more excellent.

In the conveyor belt of an embodiment of the present invention, the upper surface cover rubber layer preferably has a thickness of from 3 to 20 mm and more preferably from 6 to 15 mm. Here, when the upper surface cover rubber layer is formed of multiple layers, the thickness of the upper surface cover rubber layer refers to the total thickness of these layers.

[2] Reinforcing Layer

A core of the reinforcing layer is not particularly limited, and a core typically used in conveyor belts may be appropriately selected and used. Specific examples thereof may include, for example, materials obtained by coating a material formed from a cotton fabric and a chemical fiber or a synthetic fiber with rubber glue whereby the material is impregnated with the glue, materials obtained by folding an RFL (Resorcin Formalin Latex)-treated product, specially woven nylon canvas, and steel cords. The shape of the reinforcing layer is not particularly limited. A reinforcing layer in which sheet-shaped or wire-shaped reinforcing strips are embedded in parallel may be used. The reinforcing layers may be used alone or in a combination of two or more types.

[3] Lower Surface Cover Rubber Layer

One preferable aspect is an aspect in which the lower surface cover rubber layer is formed of two layers or more. The rubber composition used for producing the lower surface cover rubber layer is not particularly limited. Examples thereof may include known materials.

The conveyor belt of an embodiment of the present invention will be described below using an attached drawing. The conveyor belt of an embodiment of the present invention is not limited to the drawing.

FIG. 1 is a cross-sectional view schematically illustrating a preferable embodiment of the conveyor belt of an embodiment of the present invention. In FIG. 1, a conveyor belt 1 includes a reinforcing layer 3 as a center layer, and an upper surface cover rubber layer 2 and a lower surface cover rubber layer 4, which are provided on both sides of the reinforcing layer 3, wherein the upper surface cover rubber layer 2 is formed of two layers of an outer layer 11 and an inner layer 12, and the lower surface cover rubber layer 4 is formed of two layers of an outer layer 16 and an inner layer 15. The conveyor belt 1 has an object transportation conveying face 5.

At least one layer selected from the group consisting of the outer layer 11, the inner layer 12, the inner layer 15, and the outer layer 16 can be formed from the conveyor belt rubber composition of an embodiment of the present invention. At least one layer selected from the group consisting of the outer layer 11 and the inner layer 12 is preferably formed from the conveyor belt rubber composition of an embodiment of the present invention, and at least the outer layer 11 is more preferably formed from the conveyor belt rubber composition of an embodiment of the present invention.

[4] Method for Producing Conveyor Belt

The method for producing the conveyor belt of an embodiment of the present invention is not particularly limited, and commonly used methods may be employed. Specific preferred examples thereof may include, for example, a method in which raw materials for each cover rubber layer are kneaded using a roll, kneader, Banbury mixer, or the like, then the mixture is formed into each sheet-shaped cover rubber layer using a calendar or the like, after that the obtained layers are laminated in a predetermined order with the reinforcing layer being inserted thereinto, and the laminate is pressurized at a temperature of from 150 to 170° C. for from 10 to 60 minutes.

[III] Belt Conveyor

The belt conveyor of an embodiment of the present invention is a belt conveyor equipped with the conveyor belt of an embodiment of the present invention described above.

EXAMPLES

The present invention is described in further detail below by using Examples, but the present invention is not limited to these examples.

Synthesis Example

Comparative specific copolymer and specific copolymers 1 to 5 were synthesized as described below. The specific copolymers 1 to 5 correspond to the specific copolymer described above. On the other hand, the comparative specific copolymer does not correspond to the specific copolymer described above because the aromatic vinyl content is 20 mass % or less.

Comparative Specific Copolymer (Unmodified SBR)

To a solution of a mixture of 1,3-butadiene (931 g, 17,220 mmol), styrene (available from Kanto Chemical Co., Ltd., 155 g, 1,490 mmol), and 4-tert-butylpyrocatechol (2.47 g, 14.9 mmol) in cyclohexane (4.25 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba $(OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich, 25 wt % (a hexane solution), 45 mL), and cyclohexane (available from Kanto Chemical Co., Ltd., 10 mL), and the mixture was stirred at 60° C. for 14 hours. After the mixture was cooled to room temperature, methanol (available from Kanto Chemical Co., Ltd., 3.44 g) was added thereto to terminate the polymerization. The resulting solution was removed and concentrated under reduced pressure. The concentrate was poured into methanol (5 L), and a methanol-insoluble component was separated. As a result, a styrene-butadiene copolymer (unmodified SBR) (989 g, Mn=410,000, Mw=910,000, PDI=2.2) was obtained in a yield of 91%. The IR analysis showed that vinyl/trans/cis was 7/31/62. The aromatic vinyl content (content of repeating units derived from styrene) was 14 mass %, and the glass transition temperature was −88° C.

Specific Copolymer 1 (Unmodified SBR)

To a solution of a mixture of 1,3-butadiene (768 g, 14,200 mmol), styrene (available from Kanto Chemical Co., Ltd., 299 g, 2,870 mmol), and 4-tert-butylpyrocatechol (4.79 g, 28.8 mmol) in cyclohexane (4.24 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba $(OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich, 25 wt % (a hexane solution), 45 mL), and cyclohexane (available from Kanto Chemical Co., Ltd., 10 mL), and the mixture was stirred at 60° C. for 14 hours. After the mixture was cooled to room temperature, methanol (available from Kanto Chemical Co., Ltd., 3.44 g) was added thereto to terminate the polymerization. The resulting solution was removed and concentrated under reduced pressure. The concentrate was poured into methanol (5 L), and a methanol-insoluble component was separated. As a result, a styrene-butadiene copolymer (unmodified SBR) (979 g, Mn=240,000, Mw=680,000, PDI=2.8) was obtained in a yield of 92%. The IR analysis showed that vinyl/trans/cis was 5/51/44. The aromatic vinyl content (content of repeating units derived from styrene) was 29 mass %, and the glass transition temperature was −84° C.

Specific Copolymer 2 (SBR Terminally Modified with NMP)

To a solution of a mixture of 1,3-butadiene (874 g, 16,133 mmol), styrene (available from Kanto Chemical Co., Ltd., 249 g, 2,390 mmol), and 4-tert-butylpyrocatechol (3.99 g, 24.0 mmol) in cyclohexane (4.24 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba($OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich: 25 wt % (a hexane solution), 45 mL), and cyclohexane (available from Kanto Chemical Co., Ltd., 10 mL), and the mixture was stirred at 60° C. for 24 hours. After the mixture was cooled to room temperature, a mixed solution of N-methyl pyrrolidone (NMP) (5.00 g) in cyclohexane (10 mL) was added thereto to terminate the polymerization. The resulting solution was removed and concentrated under reduced pressure. The concentrate was poured into methanol (5 L), and a methanol-insoluble component was separated. As a result, a styrene-butadiene copolymer terminally modified with N-methyl pyrrolidone (NMP) (SBR terminally modified with NMP) (953 g, Mn=310,000, Mw=810,000, PDI=2.6) was obtained in a yield of 85%. The IR analysis showed that vinyl/trans/cis was 6/40/54. The aromatic vinyl content (content of repeating units derived from styrene) was 25 mass %, and the glass transition temperature was −89° C.

Specific Copolymer 3 (Unmodified SBR)

To a solution of a mixture of 1,3-butadiene (874 g, 16,133 mmol), styrene (available from Kanto Chemical Co., Ltd., 249 g, 2,390 mmol), and 4-tert-butylpyrocatechol (3.99 g, 24.0 mmol) in cyclohexane (4.50 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba($OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich, 25 wt % (a hexane solution), 45 mL), and cyclohexane (available from Kanto Chemical Co., Ltd., 10 mL), and the mixture was stirred at 60° C. for 14 hours. After the mixture was cooled to room temperature, methanol (available from Kanto Chemical Co., Ltd., 3.44 g) was added thereto to terminate the polymerization. The resulting solution was removed and concentrated under reduced pressure. The concentrate was poured into methanol (10 L), and a methanol-insoluble component was separated. As a result, a styrene-butadiene copolymer (unmodified SBR) (928 g, Mn=170,000, Mw=510,000, PDI=3.0) was obtained in a yield of 83%. The IR analysis showed that vinyl/trans/cis was 5/80/15. The aromatic vinyl content (content of repeating units derived from styrene) was 23 mass %, and the glass transition temperature was −78° C.

Specific Copolymer 4 (Unmodified SBR)

To a solution of a mixture of 1,3-butadiene (768 g, 14,200 mmol), styrene (available from Kanto Chemical Co., Ltd., 299 g, 2,870 mmol), and 4-tert-butylpyrocatechol (5.32 g, 32.0 mmol) in cyclohexane (4.24 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba($OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich, 25 wt % (a hexane solution), 45 mL), and cyclohexane (available from Kanto Chemical Co., Ltd., 10 mL), and the mixture was stirred at 60° C. for 14 hours. After the mixture was cooled to room temperature, methanol (available from Kanto Chemical Co., Ltd., 3.44 g) was added thereto to terminate the polymerization. The resulting solution was removed and concentrated under reduced pressure. The concentrate was poured into methanol (5 L), and a methanol-insoluble component was separated. As a result, a styrene-butadiene copolymer (unmodified SBR) (980 g, Mn=230,000, Mw=670,000, PDI=2.9) was obtained in a yield of 92%. The IR analysis showed that vinyl/trans/cis was 5/35/60. The aromatic vinyl content (content of repeating units derived from styrene) was 29 mass %, and the glass transition temperature was −84° C.

Specific Copolymer 5 (SBR Terminally Modified with NMP)

To a solution of a mixture of 1,3-butadiene (874 g, 16,133 mmol), styrene (available from Kanto Chemical Co., Ltd., 249 g, 2,390 mmol), and 4-tert-butylpyrocatechol (4.79 g, 28.8 mmol) in cyclohexane (4.24 kg) was added 60 mL of an initiator solution (corresponding to the specific initiator described above), prepared using n-BuLi (available from Kanto Chemical Co., Ltd., 1.60 mol/L (a hexane solution), 18 mL, 28.8 mmol), barium bis(2-ethylhexoxide) (Ba($OCH_2CH(C_2H_5)CH_2CH_2CH_2CH_3)_2$) (available from STREM Chemicals, Inc., 1 M (a toluene/hexane solution) 7.5 mL), trioctyl aluminum (available from Aldrich: 25 wt % (a hexane solution), 45 mL), and cyclohexane (available from Kanto Chemical Co., Ltd., 10 mL), and the mixture was stirred at 60° C. for 24 hours. After the mixture was cooled to room temperature, a mixed solution of N-methyl pyrrolidone (NMP) (5.00 g) in cyclohexane (10 mL) was added thereto to terminate the polymerization. The resulting solution was removed and concentrated under reduced pressure. The concentrate was poured into methanol (5 L), and a methanol-insoluble component was separated. As a result, a styrene-butadiene copolymer terminally modified with N-methyl pyrrolidone (NMP) (SBR terminally modified with NMP) (960 g, Mn=310,000, Mw=800,000, PDI=2.6) was obtained in a yield of 87%. The IR analysis showed that vinyl/trans/cis was 5/35/60. The aromatic vinyl content (content of repeating units derived from styrene) was 25 mass %, and the glass transition temperature was −89° C.

Method for Producing Conveyor Belt Rubber Composition

The conveyor belt rubber compositions of the Examples and Comparative Examples were produced by mixing components shown in Table 1 below in amounts (parts by mass) shown in Table 1. Specifically, a conveyor belt rubber composition was produced by first mixing the components shown in Table 1 below except for the sulfur and the vulcanization accelerator for 5 minutes in a Banbury mixer, then adding the sulfur and the vulcanization accelerator to the obtained mixture, and mixing the mixture with a roll.

Preparation of Vulcanized Rubber Sheet for Evaluation

The obtained conveyor belt rubber composition was formed into a sheet and was vulcanized under heating at 148° C. for 30 minutes (for 40 minutes in a case of a test piece for the cut resistance) to produce a vulcanized rubber sheet.

Evaluation

The obtained vulcanized rubber sheet was evaluated as described below.

Cut Resistance

At room temperature, a blade (blade length: 100 mm, tip angle at 2 mm in an edge portion: 20°, weight: 8 kg) was naturally dropped onto the obtained vulcanized rubber sheet from 25 cm above the vulcanized rubber sheet, and a depth (mm) of a crack produced in the vulcanized rubber sheet was measured. The results are shown in Table 1. The results are expressed as index values with the value obtained in Comparative Example 1 being assigned the index value of 100. Smaller index values indicate superior cut resistance.

Wear Resistance

The obtained vulcanized rubber sheet was subjected to a DIN abrasion test at room temperature using a DIN abrasion tester in accordance with the method described in DIN 53516, whereby an abrasion volume (DIN abrasion) was measured. Then, a ratio (vol %) of the measured abrasion volume relative to the volume of the vulcanized rubber sheet used in the DIN abrasion test was calculated. The results are shown in Table 1. The results are expressed as index values with the value obtained in Comparative Example 1 being assigned the index value of 100. Smaller index values indicate superior wear resistance.

Toughness

A dumbbell-shaped JIS No. 3 test piece (thickness 2 mm) was obtained by punching the obtained vulcanized rubber sheet in accordance with JIS K 6251:2010, and a 100% modulus and an elongation at break were evaluated under conditions of a temperature of 20° C. and a tensile speed of 500 mm/minute. A toughness parameter was determined from the following equation.

Toughness Parameter=100% modulus×elongation at break

The results are shown in Table 1. The results are expressed as index values with the value obtained in Comparative Example 1 being assigned the index value of 100. Larger index values indicate superior toughness.

TABLE 1

| | Comparative Example 1 | Comparative Example 2 | Comparative Example 3 | Comparative Example 4 | Comparative Example 5 | Comparative Example 6 | Example 1 | Example 2 | Example 3 | Example 4 | Example 5 |
|---|---|---|---|---|---|---|---|---|---|---|---|
| NR | 30 | 30 | 30 | 30 | 30 | 70 | 30 | 30 | 30 | 30 | 30 |
| SBR-1 | 70 | | | | | | | | | | |
| SBR-2 | | 70 | | | | | | | | | |
| SBR-3 | | | 70 | | | | | | | | |
| SBR-4 | | | | 70 | | | | | | | |
| Comparative Specific Copolymer | | | | | 70 | | | | | | |
| Specific copolymer 1 | | | | | | 30 | 70 | | | | |
| Specific copolymer 2 | | | | | | | | 70 | | | |
| Specific copolymer 3 | | | | | | | | | 70 | | |
| Specific copolymer 4 | | | | | | | | | | 70 | |
| Specific copolymer 5 | | | | | | | | | | | 70 |
| CB (ISAF) | 55 | 55 | 55 | 55 | 55 | 55 | 55 | 55 | 55 | 55 | 55 |
| Silica | 10 | 10 | 10 | 10 | 10 | 10 | 10 | 10 | 10 | 10 | 10 |
| Resin | 5 | 5 | 5 | 5 | 5 | 5 | 5 | 5 | 5 | 5 | 5 |
| Anti-aging agent | 3 | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 |
| Oil | 10 | 10 | 10 | 10 | 10 | 10 | 10 | 10 | 10 | 10 | 10 |
| Vulcanization accelerator | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 |
| Cut resistance | 100 | 105 | 97 | 101 | 105 | 97 | 94 | 86 | 97 | 92 | 84 |
| Wear resistance | 100 | 89 | 128 | 96 | 92 | 97 | 89 | 88 | 94 | 89 | 84 |
| Toughness | 100 | 94 | 101 | 99 | 96 | 101 | 106 | 111 | 103 | 108 | 115 |

Details of the components shown in Table 1 above are as follows:

NR: TSR 20 (natural rubber)

SBR-1: NIPOL 1502 (SBR, aromatic vinyl content (content of the repeating units derived from styrene): 24.2 mass %, vinyl structure proportion: 15.7 mol %, Tg: −54° C.), Mw: $4.9×10^{±5}$, available from ZEON Corporation)

SBR-2: NIPOL NS612 (SBR, aromatic vinyl content (content of the repeating units derived from styrene): 15.1 mass %, vinyl structure proportion: 32.2 mol %, Tg: −61° C.), Mw: 420,000, available from ZEON Corporation)

SBR-3: NIPOL NS616 (SBR, aromatic vinyl content (content of the repeating units derived from styrene): 22.7 mass %, vinyl structure proportion: 69.7 mol %, Tg: −22° C.), Mw: 1,100,000, available from ZEON Corporation)

SBR-4: Tafuden 2000R (SBR, aromatic vinyl content (content of the repeating units derived from styrene): 25 mass %, vinyl/trans/cis=9/55/36, Tg: −70° C., Mw: 260,000, available from Asahi Kasei Co., Ltd.)

Comparative specific copolymer: Comparative specific copolymer synthesized as described above (unmodified SBR)

Specific copolymer 1: Specific copolymer 1 synthesized as described above (unmodified SBR)

Specific copolymer 2: Specific copolymer 2 synthesized as described above (SBR terminally modified with NMP)

Specific copolymer 3: Specific copolymer 3 synthesized as described above (unmodified SBR)

Specific copolymer 4: Specific copolymer 4 synthesized as described above (unmodified SBR)

Specific copolymer 5: Specific copolymer 5 synthesized as described above (SBR terminally modified with NMP)

CB (ISAF): Show Black N220 (ISAF grade carbon black, available from Cabot Japan K. K.)

Silica: Nipsil AQ (silica available from Tosoh Silica Corporation)

Resin: Hyresin #120S (available from Toho Chemical Industry Co., Ltd.)

Anti-aging agent: Santoflex 6PPD (available from Flexsys)

Zinc oxide: Zinc Oxide III (available from Seido Chemical Industry Co., Ltd.)

Stearic acid: Stearic acid (available from NOF CORPORATION)

Oil: A-OMIX (available from Sankyo Yuka Kogyo K. K.)

Vulcanization accelerator: Nocceler NS-P (available from Ouchi Shinko Chemical Industrial Co., Ltd.)

Sulfur: "Golden Flower" oil-treated sulfur powder (available from Tsurumi Chemical Industry Co., Ltd.)

As can be seen from Table 1, in Examples of the present application in which the specific copolymer was contained, the excellent cut resistance and wear resistance were exhibited. Especially, in Examples 2 and 5 in which the specific copolymer was terminally modified with the specific modifier, the more excellent cut resistance, wear resistance, and toughness were exhibited.

The comparison of Examples 1, 3, and 4 (the comparison of the aspects in which the specific copolymer was not terminally modified with the specific modifier) showed that more excellent cut resistance, wear resistance, and toughness were exhibited in Examples 1 and 4 in which the specific copolymers had a proportion of 1,4-cis structure in the repeating units derived from the conjugated diene of 17 mol % or more. In particular, Example 4, in which the specific copolymer had a proportion of 1,4-cis structure in the repeating units derived from the conjugated diene of 60 mol % or more, exhibited still more excellent cut resistance and toughness.

The comparison of Examples 2 and 5 (the comparison of the aspects in which the specific copolymer was terminally modified with the specific modifier) showed that more excellent cut resistance, wear resistance, and toughness were exhibited in Example 5 in which the specific copolymer had a proportion of the 1,4-cis structure in the repeating units derived from the conjugated diene of 60 mol % or more and a proportion of the vinyl structure of 5 mol % or less.

On the other hand, in Comparative Examples 1 to 5 in which the specific copolymer was not contained, and Comparative Example 6 in which the specific copolymer was contained but the content of the specific copolymer in the diene rubber was less than 50 mass %, at least one of the cut resistance and the wear resistance was insufficient.

REFERENCE SIGNS LIST

1 Conveyor belt
2 Upper surface cover rubber layer
3 Reinforcing layer
4 Lower surface cover rubber layer
5 Object transportation conveying face
11, 16 Outer layer
12, 15 Inner layer

The invention claimed is:

1. A conveyor belt rubber composition comprising a diene rubber containing 50 mass % or more of an aromatic vinyl-conjugated diene copolymer, wherein the aromatic vinyl-conjugated diene copolymer has a content of repeating units derived from an aromatic vinyl of more than 20 mass %, a proportion of a vinyl structure in the repeating units derived from a conjugated diene of 8 mol % or less, a proportion of a 1,4-cis structure in the repeating units derived from the conjugated diene of from 10 to 62 mol %, and a proportion of a 1,4-trans structure in the repeating units derived from the conjugated diene of 40 mol % or less

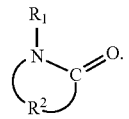

(N)

2. The conveyor belt rubber composition according to claim 1, wherein the aromatic vinyl-conjugated diene copolymer has a glass transition temperature of −50° C. or lower.

3. The conveyor belt rubber composition according to claim 2, wherein the aromatic vinyl-conjugated diene copolymer has a proportion of a 1,4-cis structure in the repeating units derived from the conjugated diene of 17 to 62 mol %.

4. The conveyor belt rubber composition according to claim 3, wherein the proportion of the vinyl structure is 5 mol % or less.

5. The conveyor belt rubber composition according to claim 3, wherein the proportion of the 1,4-cis structure is 60 to 62 mol %.

6. The conveyor belt rubber composition according to claim 5, wherein the proportion of the vinyl structure is 5 mol % or less.

7. The conveyor belt rubber composition according to claim 2, wherein the proportion of the vinyl structure is 5 mol % or less.

8. The conveyor belt rubber composition according to claim 2, wherein the aromatic vinyl-conjugated diene copolymer is terminally modified with at least one modifier selected from the group consisting of a titanium halide, a tin halide, a cyclic silazane, an alkoxysilane, an epoxide, an amine, a ketone, and a compound represented by the formula (N),

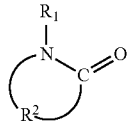

(N)

where, $R^1$ represents a hydrogen atom or an alkyl group, and $R^2$ represents an alkylene group.

9. The conveyor belt rubber composition according to claim 1, wherein the aromatic vinyl-conjugated diene copolymer has a proportion of a 1,4-cis structure in the repeating units derived from the conjugated diene of 17 to 62 mol %.

10. The conveyor belt rubber composition according to claim 9, wherein the proportion of the vinyl structure is 5 mol % or less.

11. The conveyor belt rubber composition according to claim 9, wherein the aromatic vinyl-conjugated diene copolymer is terminally modified with at least one modifier selected from the group consisting of a titanium halide, a tin halide, a cyclic silazane, an alkoxysilane, an epoxide, an amine, a ketone, and a compound represented by the formula (N),

where, $R^1$ represents a hydrogen atom or an alkyl group, and $R^2$ represents an alkylene group.

12. The conveyor belt rubber composition according to claim 9, wherein the proportion of the 1,4-cis structure is 60 to 62 mol %.

13. The conveyor belt rubber composition according to claim 12, wherein the proportion of the vinyl structure is 5 mol % or less.

14. The conveyor belt rubber composition according to claim 12, wherein the aromatic vinyl-conjugated diene copolymer is terminally modified with at least one modifier selected from the group consisting of a titanium halide, a tin halide, a cyclic silazane, an alkoxysilane, an epoxide, an amine, a ketone, and a compound represented by the formula (N),

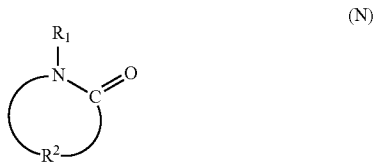

where, $R^1$ represents a hydrogen atom or an alkyl group, and $R^2$ represents an alkylene group.

15. The conveyor belt rubber composition according to claim 1, wherein the proportion of the vinyl structure is 5 mol % or less.

16. The conveyor belt rubber composition according to claim 1, wherein the aromatic vinyl-conjugated diene copolymer is terminally modified with at least one modifier selected from the group consisting of a titanium halide, a tin halide, a cyclic silazane, an alkoxysilane, an epoxide, an amine, a ketone, and a compound represented by the formula (N),

where, $R^1$ represents a hydrogen atom or an alkyl group, and $R^2$ represents an alkylene group.

17. A conveyor belt comprising an upper surface cover rubber layer; a reinforcing layer; and a lower surface cover rubber layer, wherein
at least the upper surface cover rubber layer is formed using the conveyor belt rubber composition described in claim 1.

18. A belt conveyor equipped with the conveyor belt described in claim 17.

19. A method for producing a conveyor belt rubber composition, the conveyor belt rubber composition containing a diene rubber containing 50 mass % or more of an aromatic vinyl-conjugated diene copolymer, the aromatic vinyl-conjugated diene copolymer having a content of repeating units derived from an aromatic vinyl of more than 20 mass %, a proportion of a vinyl structure in repeating units derived from a conjugated diene of 8 mol % or less, a proportion of a 1,4-cis structure in the repeating units derived from the conjugated diene of from 10 to 62 mol %, and a proportion of a 1,4-trans structure in the repeating units derived from the conjugated diene of 40 mol % or less, the method comprising: copolymerizing monomers comprising the aromatic vinyl and the diene using an initiator prepared using an organolithium compound, an alkyl aluminum, and a metal alcoholate to produce the aromatic vinyl-conjugated diene copolymer.

20. A method for producing a conveyor belt rubber composition, the conveyor belt rubber composition containing a diene rubber containing 50 mass % or more of an aromatic vinyl-conjugated diene copolymer, the aromatic vinyl-conjugated diene copolymer having a content of repeating units derived from an aromatic vinyl of more than 20 mass % and a proportion of vinyl structure in repeating units derived from a conjugated diene of 8 mol % or less, a proportion of a 1,4-cis structure in the repeating units derived from the conjugated diene of from 10 to 62 mol %, and a proportion of a 1,4-trans structure in the repeating units derived from the conjugated diene of 40 mol % or less, and being terminally modified with at least one modifier selected from the group consisting of a titanium halide, a tin halide, a cyclic silazane, an alkoxysilane, an epoxide, an amine, a ketone, and a compound represented by formula (N), the method comprising:
copolymerizing monomers comprising the aromatic vinyl and the diene using an initiator prepared using an organolithium compound, an alkylaluminum and a metal alcoholate, and then
terminating the polymerization using an electrophile selected from a titanium halide, a tin halide, a cyclic silazane, an alkoxysilane, an epoxide, an amine, a ketone, and a compound represented by formula (N) to produce the aromatic vinyl-conjugated diene copolymer,

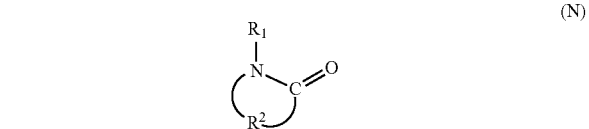

where, $R^1$ represents a hydrogen atom or an alkyl group, and $R^2$ represents an alkylene group.

* * * * *